(12) United States Patent
Vassilovski et al.

(10) Patent No.: US 11,395,117 B2
(45) Date of Patent: Jul. 19, 2022

(54) VEHICLE EMERGENCY V2X NOTIFICATION BASED ON SENSOR FUSION

(71) Applicant: QUALCOMM Incorporated, San Diego, CA (US)

(72) Inventors: Dan Vassilovski, Del Mar, CA (US); Hong Cheng, Bridgewater, NJ (US); Shailesh Patil, San Diego, CA (US); Richard Hovey, Branchburg, NJ (US); Arjun Bharadwaj, Cupertino, CA (US); Sudhir Kumar Baghel, Hillsborough, NJ (US); Jose Edson Vargas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/723,891

(22) Filed: Dec. 20, 2019

(65) Prior Publication Data

US 2020/0236521 A1    Jul. 23, 2020

Related U.S. Application Data

(60) Provisional application No. 62/794,633, filed on Jan. 20, 2019.

(51) Int. Cl.
*H04W 4/46* (2018.01)
*B60L 3/00* (2019.01)
(Continued)

(52) U.S. Cl.
CPC .............. *H04W 4/46* (2018.02); *B60L 3/0015* (2013.01); *B60Q 9/00* (2013.01); *G08B 25/016* (2013.01)

(58) Field of Classification Search
CPC .......... H04W 4/46; B60L 3/0015; B60Q 9/00; G08B 25/016
(Continued)

(56) References Cited

U.S. PATENT DOCUMENTS

2010/0114467 A1* 5/2010 Samuel .................. G08G 1/164
701/119
2016/0133131 A1* 5/2016 Grimm ............ G08G 1/096725
701/117

(Continued)

*Primary Examiner* — Daryl C Pope
(74) *Attorney, Agent, or Firm* — Qualcomm Incorporated

(57) ABSTRACT

Methods, systems, computer-readable media, and apparatuses for vehicle emergency vehicle-to-anything (V2X) notification based on sensor fusion are presented. In some embodiments, a vehicle may receive an indication of an issue or impairment of the vehicle or an occupant of the vehicle, including the driver. Using information from sensors within the vehicle, an on-board processor may determine the nature of the impairment. Information about the nature of the impairment may then be transmitted, using V2X notification, to neighboring vehicles and/or an infrastructure entity (e.g., a base station, a roadside unit, a radio tower, and/or a central application server). The neighboring vehicles may then negotiate using V2X communication with the impaired vehicle and the other neighboring vehicles and/or be directed by the infrastructure entity to proceed using a negotiated course of action that accounts for the nature of the impairment in the impaired vehicle.

19 Claims, 7 Drawing Sheets

(51) Int. Cl.
  *B60Q 9/00* (2006.01)
  *G08B 25/01* (2006.01)
(58) Field of Classification Search
  USPC .............. 340/425.5, 901–905, 539.1, 539.11
  See application file for complete search history.

(56) References Cited

U.S. PATENT DOCUMENTS

| | | | |
|---|---|---|---|
| 2016/0278065 A1* | 9/2016 | Kim .................... | H04W 72/046 |
| 2017/0025012 A1* | 1/2017 | Thompson ............. | G08G 1/166 |
| 2017/0043632 A1* | 2/2017 | Cruz Mendez ..... | B60C 23/0433 |
| 2017/0287331 A1* | 10/2017 | Laur ................... | H04W 84/005 |
| 2018/0001893 A1* | 1/2018 | Wei ....................... | B60W 30/16 |
| 2018/0308360 A1* | 10/2018 | Regmi ................. | G08G 1/0965 |
| 2018/0322782 A1* | 11/2018 | Engel .................... | G08G 1/166 |
| 2019/0176687 A1* | 6/2019 | Nagata .................... | B60Q 1/52 |
| 2019/0279440 A1* | 9/2019 | Ricci ....................... | H04W 4/48 |

\* cited by examiner

VEHICLE EMERGENCY V2X NOTIFICATION BASED ON SENSOR FUSION

RELATED APPLICATIONS

This application claims the benefit of and priority to U.S. Provisional Application No. 62/794,633, filed Jan. 20, 2019, entitled "VEHICLE EMERGENCY V2X NOTIFICATION BASED ON SENSOR FUSION," which is assigned to the assignee hereof, and is incorporated herein in its entirety by reference for all purposes.

BACKGROUND

Aspects of the disclosure relate to vehicle-to-anything (V2X) communication with sensor fusion.

Vehicles today often have various sensors for identifying driver impairment and/or vehicle malfunction. However, even if a vehicle may be able to identify an issue within the vehicle, neighboring vehicles and drivers are left unaware of the issue. Even if a driver activates the hazard lights, neighboring vehicle drivers have no way of knowing why the hazard lights have been activated. Without information as to the cause, neighboring vehicle drivers (and neighboring autonomous vehicles) are left unsure as to whether they should give the impaired vehicle more space, call 911, allow the impaired vehicle to enter the right lane to exit the roadway or to enter the breakdown lane, or some other action.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for vehicle-to-anything (V2X) communication of vehicle emergency status using sensor fusion. The method may include receiving, by a processor of a vehicle, a first signal indicating an issue. The method may also include, in response to receiving the first signal, determining, by the processor of the vehicle, the issue based on information from at least one vehicle sensor of the vehicle. The method may also include transmitting, using V2X communication, a second signal indicating the issue. Other embodiments of this aspect include corresponding computer systems, apparatus, and computer programs recorded on one or more computer storage devices, each configured to perform the actions of the methods.

Implementations may include one or more of the following features. In some embodiments, the first signal is received due to the at least one vehicle sensor detecting the issue. In some embodiments, the processor may automatically activate a hazard indicator light (e.g., the vehicle hazard lights) in response to determining the issue.

In some embodiments, the first signal is received due to an occupant of the vehicle activating a hazard indicator (e.g., vehicle hazard indicator lights). In some embodiments, determining the issue includes polling the vehicle sensors to obtain a vehicle status from each of the vehicle sensors.

In some embodiments, the second signal that is transmitted may include an indication of the nature of the issue. In some embodiments, the second signal may include an indication of actions taken by the vehicle. In some embodiments, the second signal may include an indication of requested action from neighboring vehicles.

In some embodiments, the vehicle sensors may include any of a biometric sensor for sensing a vehicle occupant status, a visual sensor for sensing a driver status, a voice sensor for sensing verbal indication of the issue, a wearable sensor paired to the vehicle for sensing the vehicle occupant status, a vehicle malfunction sensor for sensing a malfunction of the vehicle.

In some embodiments, the second signal is transmitted to neighboring vehicles, including neighboring vehicles that do not have a line-of-sight to the vehicle experiencing the issue. In some embodiments, the second signal may hop using neighboring vehicles to other vehicles that are further away from the vehicle experiencing the issue and/or those that do not have a line-of-sight to the vehicle experiencing the issue. In some embodiments, the second signal is transmitted to an infrastructure entity. In some embodiments, the infrastructure entity may provide coordinated direction to the vehicle experiencing the issue and neighboring vehicles to ensure the response of each vehicle is coordinated. Therefore, the processor may, in some embodiments, receive a third signal providing a course of action from the infrastructure entity. In some embodiments, the processor of the vehicle may engage in V2X inter-vehicle negotiation with one or more neighboring vehicles. Implementations of the described techniques may include hardware, a method or process, or computer software on a computer-accessible medium.

BRIEF DESCRIPTION OF THE DRAWINGS

Aspects of the disclosure are illustrated by way of example. In the accompanying figures, like reference numbers and symbols in the various figures indicate like elements, in accordance with certain example implementations.

Non-limiting and non-exhaustive aspects are described with reference to the following figures.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Vehicle-to-anything (V2X) communication is a communication that is currently being developed. V2X communication is anticipated to be used on the upcoming fifth generation (5G) network. V2X and 5G are defined by standards organizations, and the V2X communications discussed herein are anticipated to be in compliance with the V2X communications standards over the 5G network standards. However, the communications disclosed herein are not limited to V2X communications and/or the 5G network. Rather, new and developing protocols and communication methods may be used to provide the same information between vehicles and used accordingly as described herein.

In some embodiments, sensors within an impaired vehicle may be used to identify the nature of the impairment or issue. An on-board processor, or in some cases an infrastructure entity (e.g., a roadside unit or a central application server), may use the sensor information to identify the nature of the impairment or issue. V2X communication may be used to transmit the information about the issue, including the nature of the issue, actions already taken by the impaired vehicle, and/or requests for action from neighboring vehicles, from the impaired vehicle to the neighboring vehicles and/or an infrastructure entity. The notified neighboring vehicles may then engage in V2X inter-vehicle negotiation between the other neighboring vehicles and/or the impaired vehicle to ensure coordination to gracefully handle the issue. For example, the neighboring vehicles may coordinate with each other and the impaired vehicle to allow the impaired vehicle to enter the right lane to exit or enter the breakdown lane. In some cases, the infrastructure entity may make decisions and provide directions to each of the neighboring vehicles and the impaired vehicle to coordinate the graceful handling of the issue.

Figure 1:
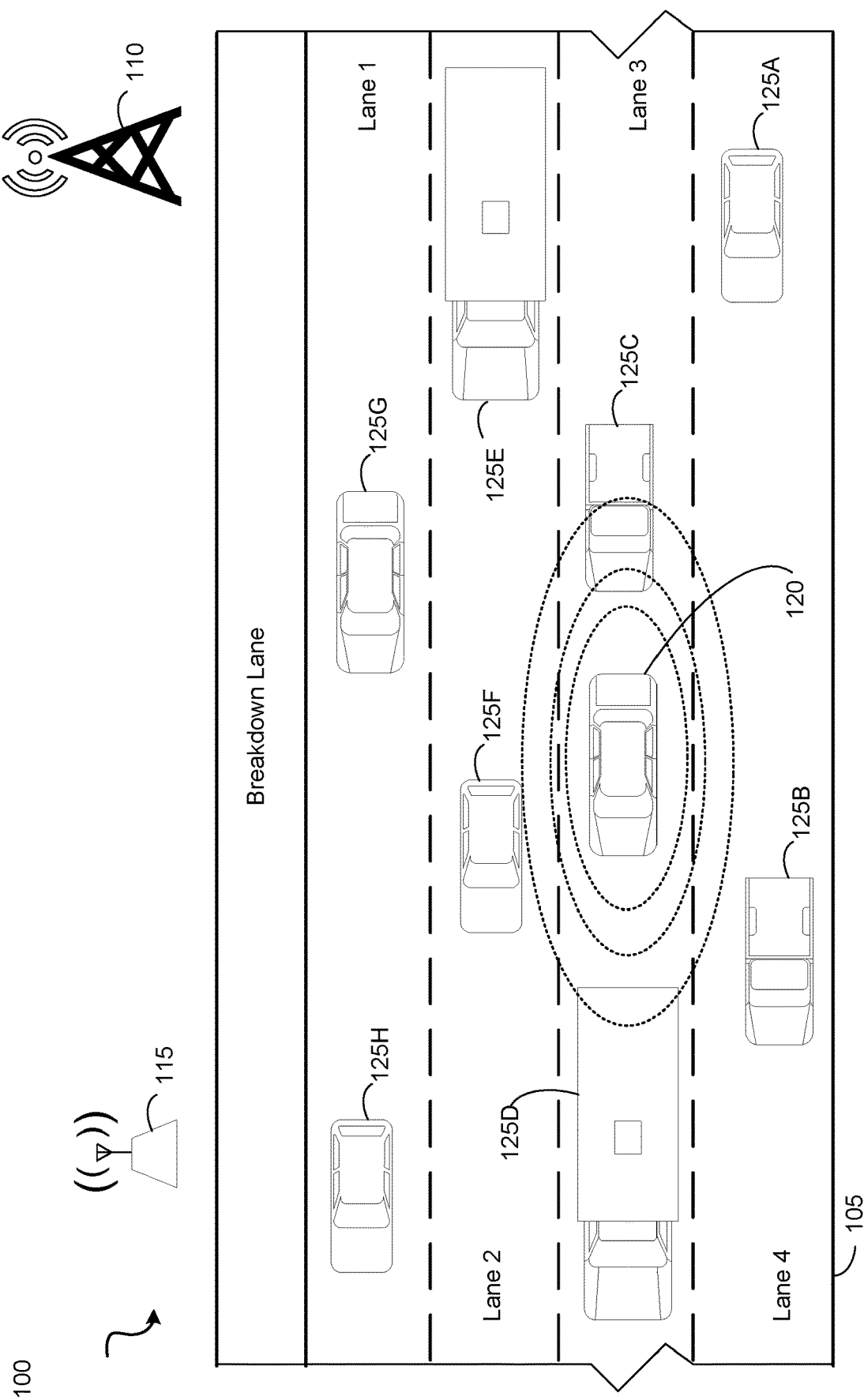
FIG. 1 illustrates a simplified diagram of a V2X communication system, according to an embodiment.

FIG. 1 illustrates a simplified diagram of a system 100 that may incorporate one or more embodiments. The system 100 may be an example diagram of a system for V2X communication that provides emergency V2X notification using sensor fusion. The system may include a roadway 105, a radio tower 110, a road side unit 115, impaired vehicle 120, and neighboring vehicles 125. System 100 is an example diagram and does not imply a limitation on the number of neighboring vehicles 125, impaired vehicles 120, road side units 115, radio towers 110, or roadways 105 that may exist within such a system 100.

Roadway 105 may be any suitable roadway on which vehicles travel. Roadway 105 depicts a 4-lane highway. However, roadway 105 may have any number of lanes of traffic flowing in any direction. For example, roadway 105 may be a two-lane road with one lane of traffic flowing in each direction. Roadway 105 may also incorporate intersections, with traffic flowing in one or more lanes in any direction.

Radio tower 110 may be any suitable radio tower for a cellular network such as, for example, a 5G network. While a single radio tower 110 is depicted, any number of radio towers 110 may be included in system 100. Radio tower 110 may be a base station as discussed with respect to FIG. 6. Radio tower 110 may communicate with roadside unit 115, impaired vehicle 120, neighboring vehicles 125, and or any other component communicating on the radio tower 110 associated network. Radio tower 110 may be referred to herein as an infrastructure entity. Radio tower 110 may include, for example, a central application server and/or communicate with a central application server, which may also be an infrastructure entity. The central application server (not shown) may have information about roadway 105 and the vehicles on roadway 105 including impaired vehicle 120, neighboring vehicles 125, many other vehicles further removed from impaired vehicle 120, as well as infrastructure information including the locations of intersections, traffic signals, and the like. The central application server may have information about each vehicle including direction of travel, speed of travel, vehicle status (e.g., impairment status), vehicle size, vehicle weight, and so forth. The central application server may be capable of providing instructions to one or more vehicles on roadway 105 and/or coordinate vehicle behavior to gracefully address issues that arise with vehicles on roadway 105.

Roadside unit 115 may be any suitable roadside unit 115 that is placed, typically, along roadway 105. Roadside unit 115 may communicate with impaired vehicle 120, neighboring vehicles 125, radio tower 110, and/or any other component communicating on the roadside unit 115 associated network. Roadside unit 115 may be referred to herein as an infrastructure entity. Roadside unit 115 may receiving information from impaired vehicle 120 and/or neighboring vehicles 125 and provide the information to or via radio tower 110 to the central application server. In some embodiments, roadside unit 115 may coordinate communication and/or instructions to impaired vehicle 120 and/or neighboring vehicles 125. Roadside unit 115 may have information about vehicles on roadway 105 that are nearby roadside unit 115. While radio tower 110 and/or the central application server may have information about vehicles and roadway 105 more globally (although still relatively local such as, for example, a fifty mile radius), roadside unit 115 may service a smaller area and communicate directly with vehicles that are in a five mile radius.

Impaired vehicle 120 may be any suitable vehicle including, for example, a private vehicle or a commercial vehicle. Example vehicles include a passenger car, a passenger truck, a passenger van, a cargo van, a box truck, a tractor-trailer, a motorcycle, and the like. Impaired vehicle 120 may be subject to any impairment. For example, the vehicle may have a malfunction such as low tire pressure, a flat tire, engine overheating, brake failure, low engine oil, empty windshield washer fluid, transmission failure, or any other vehicle malfunction. As another example of vehicle impairment, an occupant of the vehicle, including the driver or a passenger, may be impaired for a health reason such as heart attack, diabetic shock, fainting, or any other health reason. As yet another example of vehicle impairment, the driver may be impaired due to fatigue or substance use (i.e., driving under the influence of alcohol or drugs including illicit drugs, over-the-counter drugs, or prescription drugs). As another example of vehicle impairment, the vehicle may be experiencing an external stress such as, for example, high cross winds. While only a single impaired vehicle 120 is depicted in FIG. 1 for ease of discussion, any number of impaired vehicles 120 may be present on roadway 105. Impaired vehicle 120 is shown surrounded by dashed ellipses to indicate the V2X communications that may be transmitted by impaired vehicle 120 as described in more detail below. Various components of impaired vehicle 120 are shown in more detail with respect to FIG. 2.

Neighboring vehicles 125 may be any suitable vehicles including, for example, a private vehicle or a commercial vehicle. Example vehicles include a passenger car, a passenger truck, a passenger van, a cargo van, a box truck, a tractor-trailer, a motorcycle, and the like. Neighboring vehicles 125 may include some or all, and in some embodiments even more, of the components described with respect to impaired vehicle 120. Neighboring vehicles 125 may include the capability to send and receive V2X communications as described in more detail herein.

In use, system 100 may provide emergency V2X notification using sensor fusion as described using the following example. Impaired vehicle 120 and neighboring vehicles 125 may be travelling along roadway 105. Impaired vehicle 120 and neighboring vehicles 125 may be communicating via V2X communication between the vehicles 120 and 125, with roadside unit 115 and/or with radio tower 110. Impaired vehicle 120 may be travelling without issue when it suddenly experiences an impairment (i.e., an issue). The nature of the impairment may not immediately be known to the impaired vehicle, the driver of the impaired vehicle, the neighboring vehicles 125 or their drivers, the roadside unit 115, or the radio tower 110. As an example, impaired vehicle may experience engine overheating. A sensor within impaired vehicle 120 may identify the engine overheating issue and trigger the check engine light. The driver, seeing the light, may activate the impaired vehicle 120 hazard lights. The sensor may provide the signal to the V2X notification with sensor fusion system of the impaired vehicle 120. In some embodiments, the V2X notification with sensor fusion system may, in response to receiving the signal, extract from the signal the source of the impairment (e.g., engine overheating). The V2X notification with sensor fusion system may send a V2X notification to neighboring vehicles 125 and roadside unit 115 that indicates that the impaired vehicle 120 is experiencing engine overheating and that impaired vehicle 120 should be granted access to the breakdown lane. Roadside unit 115 may transmit instructions to neighboring vehicles 125 to coordinate the graceful exit of impaired vehicle 120 to the breakdown lane. For example, Roadside unit 115 may instruct neighboring vehicle 125E to slow down and neighboring vehicle 125F to speed up to grant impaired vehicle 120 access from lane 3 to lane 2 of roadway 105. Roadside unit 115 may then instruct impaired vehicle 120 to enter lane 2. Upon completion of that maneuver with impaired vehicle in lane 2, roadside unit 115 may instruct neighboring vehicle 125G to speed up and impaired vehicle 120 to enter lane 1 then the breakdown lane.

Figure 7:
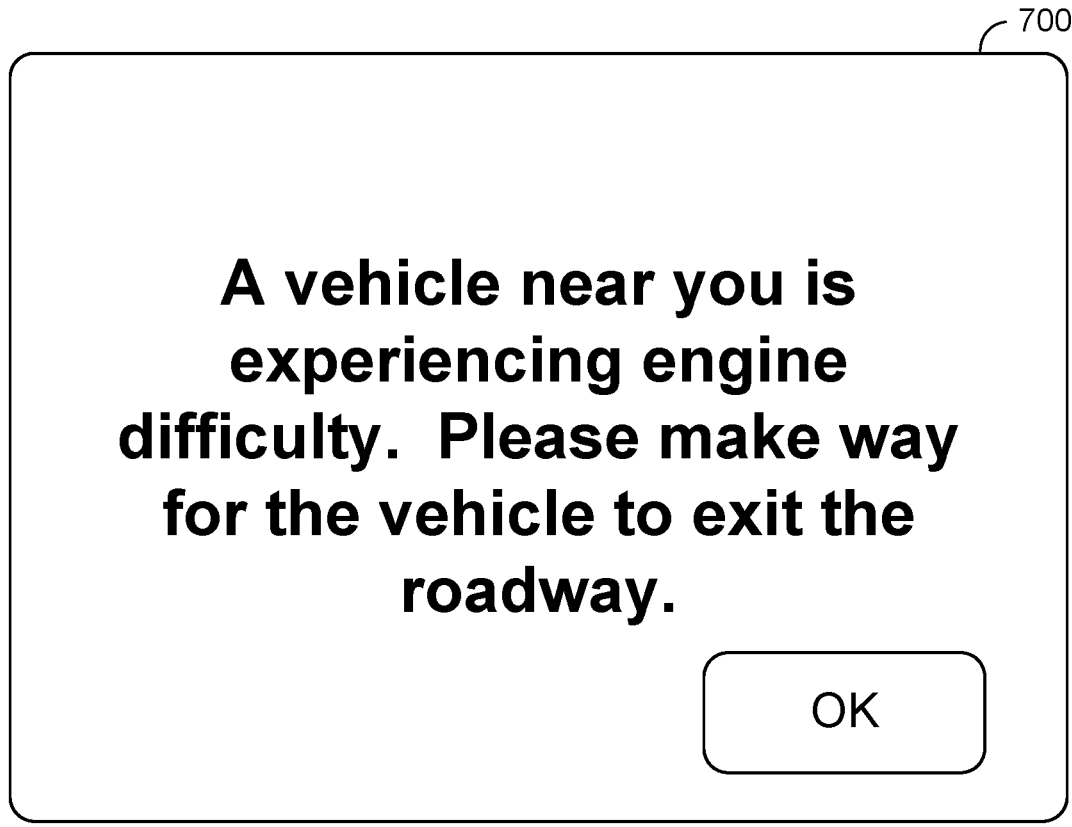
FIG. 7 illustrates an example display, according to an embodiment.

As another example, impaired vehicle 120 may experience a driver impairment issue, such as a driver experiencing a health issue with sudden onset symptoms like a heart attack. Sensors within impaired vehicle 120 may identify the driver distress and, in response, provide the information to the V2X notification with sensor fusion system. The V2X notification with sensor fusion system may, in response to receiving the signal, activate the impaired vehicle 120 hazard lights and send a V2X notification to the neighboring vehicles 125 and/or roadside unit 115 indicating that the nature of the emergency is that the driver is in distress. In some embodiments, the V2X notification may indicate that that the impaired vehicle 120 has contacted 911. In some embodiments, the V2X notification may request that a neighboring vehicle 125 contact 911. In some embodiments, the V2X notification may request that the neighboring vehicles 125 give the impaired vehicle 120 space. The neighboring vehicles 125 and impaired vehicle 120 may, for example, engage in V2X inter-vehicle negotiation to provide the appropriate space to impaired vehicle 120. For example, neighboring vehicles 125E and 125F may negotiate with each other and neighboring vehicles 125G and 125C to slow down and speed up appropriately to allow neighboring vehicles 125E and 125F to enter lane 1, leaving lane 2 available for neighboring vehicle 125C to enter. Other similar negotiations between neighboring vehicles 125 and impaired vehicle 120 may also be made to make further space between the impaired vehicle 120 and other neighboring vehicles 125. The neighboring vehicles 125 may also negotiate as to which driver or neighboring vehicle 125 may make the 911 call. By negotiating the call, the 911 line will receive a single call rather than many to avoid flooding the network (e.g., telephone, cellular, and/or 5G network) and 911 call center with unnecessary duplicated information. In some embodiments, the neighboring vehicles 125 receiving indication of the nature of the impairment of impaired vehicle 120 and any requested action such as giving impaired vehicle 120 space and/or calling 911 may provide the information to the driver (if not an autonomous vehicle) via any appropriate notification mechanism. For example, the information may be provided visually via a heads-up display or a display screen within neighboring vehicle 125. FIG. 7 illustrates an example vehicle display 700 showing an example user interface that may display a warning or other information in a neighboring vehicle, alerting the driver of the neighboring vehicle of the emergency. As another example, the information may be provided audibly using a sound system within neighboring vehicle 125 including, for example, the entertainment sound system found within most vehicles. In some embodiments, the neighboring vehicles may be autonomous vehicles. In such embodiments inter-vehicle negotiation and subsequent vehicle action may take place without driver or passenger involvement.

As yet another example, impaired vehicle 120 may experience external forces that indicate an impairment. For example, a collision sensor may indicate a collision, a high cross wind sensor may indicate high cross winds, or any other external force sensor may indicate any other external force impairment. Using the high cross wind example, a sensor may indicate high cross winds to impaired vehicle 120. While the high cross winds may not impact impaired vehicle 120 substantially because it is a relatively small passenger vehicle, high cross winds may more substantially impact neighboring vehicle 125E that is a much larger vehicle. Because the impairment of impaired vehicle 120 may not be substantial, the V2X notification may be broadcast out to be aware of high cross winds to neighboring vehicles 125. In some embodiments, the V2X communication may "hop" to vehicles that are further from impaired vehicle 120 by retransmitting from other neighboring vehicles 125. In some embodiments, neighboring vehicles 125 and impaired vehicle 120 may engage in V2X inter-vehicle negotiation to determine if any neighboring vehicle 125 may be subject to impact from the high cross winds. In this example, neighboring vehicles 125D and 125E may be subject to impairment from high cross winds. The neighboring vehicles 125 may negotiate to give neighboring vehicles 125D and 125E additional space to account for the high cross winds, for example.

Figure 2:
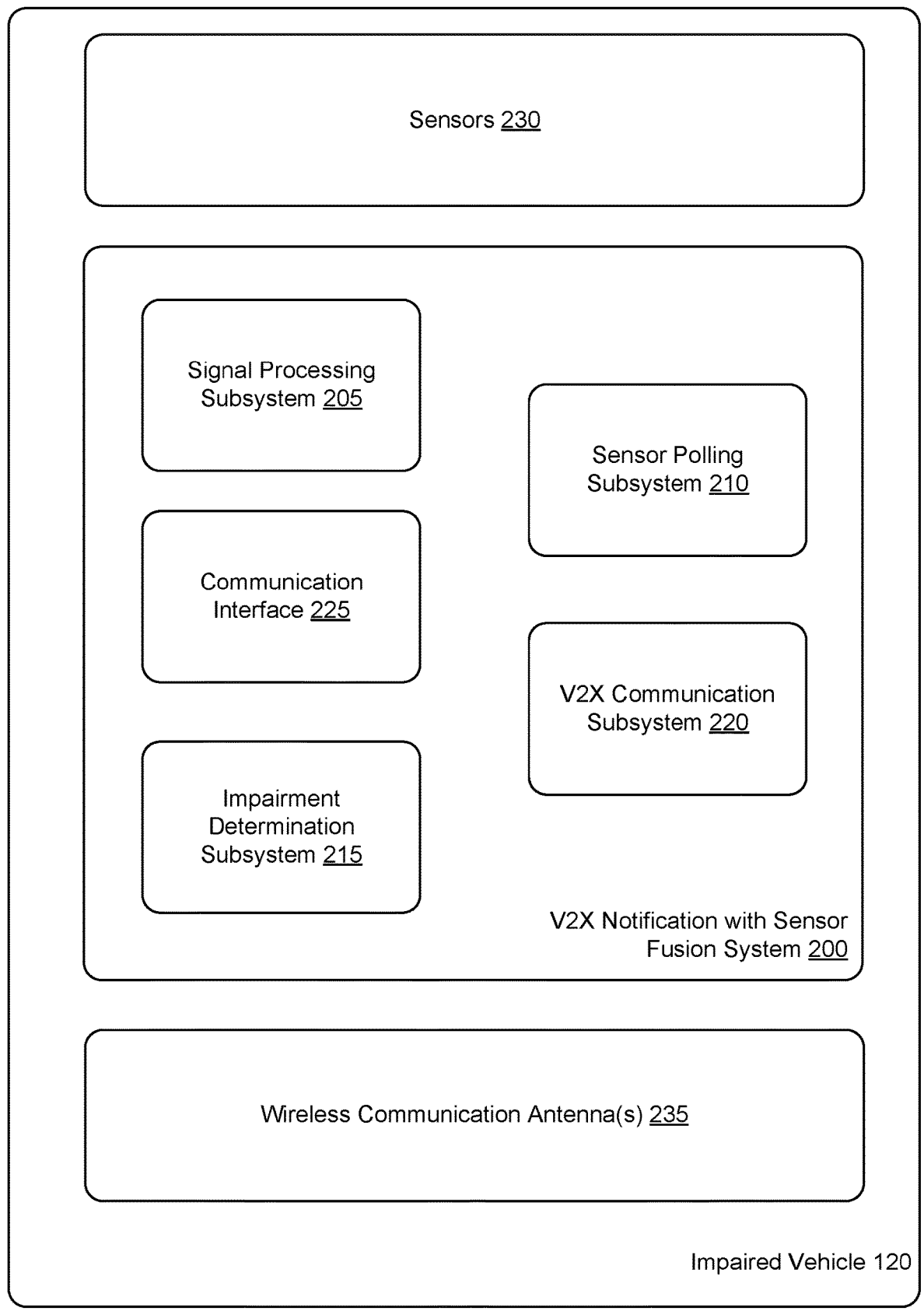
FIG. 2 illustrates a simplified diagram of components of an impaired vehicle having a V2X communication system with sensor fusion, according to an embodiment.

FIG. 2 illustrates a simplified diagram of components of impaired vehicle 120 having a V2X notification with sensor fusion system 200. The components depicted including the V2X notification with sensor fusion system 200, wireless communication antenna(s) 235, and sensors 230 are not meant to be limiting to other components of impaired vehicle 120. Further, the functionality described herein with respect to the V2X notification with sensor fusion system 200 may be implemented with more or fewer components than those described herein without affecting the scope of this disclosure. Impaired vehicle 120 may be, for example, UE 400 of FIG. 4 and accordingly include the components described with respect to FIG. 4.

Impaired vehicle 120 may include V2X notification with sensor fusion system 200, wireless communication antenna(s) 235, and sensors 230. The sensors 230 may include any suitable sensors within impaired vehicle 120. For example, sensors 230 may include one or more vehicle malfunction sensors such as a tire pressure sensor, an oil pressure sensor, an engine temperature sensor, a collision sensor, and/or the like. Sensors 230 may also include occupant sensors that may determine the status of one or more occupants of the impaired vehicle 120 including both the driver and/or passengers. For example, sensors 230 may include a biometric sensor to determine whether an occupant has a health impairment, a camera or other visual detection sensor that detects fainting, sleeping, and/or other gesture recognition of the driver and/or passengers in the impaired vehicle 120, wearable sensors paired to the impaired vehicle 120 that may indicate the health status of the driver or passenger wearing the wearable sensor, voice or speech detection sensors that may identify sounds of distress such as a verbal request for help, and the like. In some embodiments, a sensor may indicate whether an occupant of the vehicle has activated emergency warning or hazard lights of impaired vehicle 120. Sensors 230 may communicate with V2X notification with sensor fusion system 200.

Impaired vehicle 120 may include V2X notification with sensor fusion system 200. V2X notification with sensor fusion system 200 may include signal processing subsystem 205, sensor polling subsystem 210, impairment determination subsystem 215, V2X communication subsystem 220, and communication interface 225. While the components and subsystems described within V2X notification with sensor fusion system 200 is given for ease of discussion, the functionality described may be implemented in more or fewer components and/or subsystems without impacting the scope of this disclosure.

Signal processing subsystem 205 may receive one or more signals from sensors 230. For example, a sensor 230 may identify an impairment of impaired vehicle 120 and send a signal indicating the impairment to V2X notification with sensor fusion system 200. The signal indicating the impairment may be received by signal processing subsystem 205. The signal processing subsystem may extract from the signal the nature of the impairment. In some embodiments, the signal may indicate a vehicle malfunction such as, for example, engine overheating or low tire pressure. In some embodiments, the signal may indicate that an occupant of the vehicle has activated the hazard lights, indicating an issue or impairment. In some embodiments, the signal may indicate that the driver or a passenger of the impaired vehicle 120 is experiencing distress, a health issue, fatigue, substance impairment, or some other impairment. Whatever the impairment indicated by the signal, signal processing subsystem 205 may extract information from the signal to identify the impairment.

In some embodiments, signal processing subsystem 205 may, in response to receiving the signal, request sensor polling subsystem 210 to poll the sensors 230 to identify the nature of the impairment or issue. For example, in some embodiments, activation of the hazard lights of impaired vehicle 120 may cause signal processing subsystem 205 to identify that the hazard lights have been activated, but that may not be sufficient information to identify the nature of the impairment. As another example, a vehicle occupant may verbally indicate distress, but the cry for help may be insufficient to determine the nature of the issue or impairment. Upon determining that the hazard lights have been activated or a verbal distress indication was detected or any other indication of an impairment without specific information indicating the nature of the impairment, signal processing subsystem 205 may request sensor polling subsystem 210 to poll the sensors 230 to identify the nature of the impairment. For example, sensors 230 may include biometric sensors that may indicate a health, fatigue, or substance use impairment of the driver or other occupant of the impaired vehicle 120. Another example may be a vehicle malfunction that sensors 230 may provide information that indicate a specific vehicle malfunction such as low oil pressure, engine overheating, low tire pressure, and the like. In some embodiments, even if sensors 230 indicated a specific issue with the impaired vehicle 120, sensor polling subsystem 210 may identify other impairments the impaired vehicle 120 may be experiencing. Sensor polling subsystem 210 may individually poll sensors 230, which may provide in response to the polling request, a status of each sensor 230 to sensor polling subsystem 210.

Impairment determination subsystem 215 may receive the signal from signal processing subsystem and/or information extracted from the signal by signal processing subsystem 205 as well as information from sensor polling subsystem 210. Using the information obtained from signal processing subsystem 205 and/or sensor polling subsystem 210, impairment determination subsystem 215 may determine the nature of the impairment. For example, biometric sensors that indicate for example, that driver eyelid position is low through visual identification of the eyelid position in addition to swerving sensors that may indicate the impaired vehicle 120 is not travelling steadily may indicate that the driver is fatigued or substance use impaired. Impairment determination subsystem 215 may include various algorithms and machine learning algorithms that may analyze the sensor indicators and combine the information to determine the nature of the impairment and/or if there are more than one impairment. For example, a swerving sensor may indicate unsteady driving, a collision sensor may indicate a collision, and a biometric sensor may indicate a health issue of the driver and/or one or more occupants of the impaired vehicle 120. The combination of sensor information may depend on timing of the indicators to determine, for example, whether a surprise collision caused the driver to experience shock, or, as another example, that a heart attack of the driver resulted in a collision. Impairment determination subsystem 215 may analyze the sensor information to determine the nature of the impairment regardless of the seriousness of the situation.

Impairment determination subsystem 215 may, in addition to determining the impairment of the impaired vehicle 120, also determine whether any action should be performed by the impaired vehicle 120 and/or any requests from neighboring vehicles 125. For example, if a passenger of the impaired vehicle 120 experiences a serious health issue, such as a heart attack, the impaired vehicle 120 may call 911 and connect the driver through the audio system of the impaired vehicle 120 with the dispatcher. As another example, if the driver of impaired vehicle 120 is experiencing a serious health issue, a request for a neighboring vehicle 125 to contact 911 may be appropriate. In some instances, various courses of action from neighboring vehicles 125 may be appropriate depending on the nature of the impairment. For example, if the impaired vehicle 120 is experiencing a serious vehicle malfunction, the impaired vehicle may need access to the breakdown lane, so a request for neighboring vehicles 125 to grant access to the breakdown lane may be appropriate. As another example, if the impaired vehicle has run out of windshield washer fluid, the current weather conditions may impact the requested action. For example, if the weather is rainy, perhaps no request or V2X notification is needed. If, however, the weather is gloomy with wet and/or slushy roads, giving the impaired vehicle additional space may be appropriate. Impairment determination subsystem 215 may provide the nature of the issue, information about actions the impaired vehicle has taken (e.g., called 911), and/or requested actions by neighboring vehicles 125 to V2X communication subsystem 220.

V2X communication subsystem 220 may use the information from impairment determination subsystem 215 to generate a V2X notification that it may transmit to neighboring vehicles 125, roadside unit 115, and/or radio tower 110. The V2X notification may be transmitted via wireless communication antenna(s) 235, and the notification may be a unicast message to a single receiver, a multicast message to multiple receivers, a broadcast message sent to all receivers within range, and/or any other suitable type of message. Wireless communication antenna(s) 235 may be, for example, wireless communication antenna(s) 432 of FIG. 4. In some embodiments, vehicles driving near each other are coordinating and communicating via V2X regularly in what is sometimes called a platoon. The platoon may communicate regularly with status information between the vehicles within the platoon. The emergency V2X notification from V2X communication subsystem 220 may be transmitted to the platoon. Other communications within the platoon may also be sent and received via V2X communication subsystem 220. If the neighboring vehicles 125 engage in V2X inter-vehicle negotiation, the V2X communications may be sent and received by V2X communication subsystem 220.

Communication interface 225 may be an interface that allows communication and/or interaction between components of V2X notification with sensor fusion system 200 and the driver of impaired vehicle 120. For example, communication interface 225 may receive an indication from impairment determination subsystem 215 to call 911. Communication interface 225 may use a pairing of the driver's or other occupant's cellular telephone to call 911 and interface the call through, for example, the audio system in impaired vehicle 120 so that the driver may speak with the 911 dispatcher. As another example, information may be provided by V2X notification with sensor fusion system 200 to the driver via communication interface 225 by interacting via a heads up display, an LCD display, the impaired vehicle 120 entertainment and/or audio system, and/or any other suitable component of the impaired vehicle that may be used to communicate information to the driver or occupants of the impaired vehicle 120.

In some embodiments, other impaired vehicles may send a V2X notification to impaired vehicle 120. In other words, neighboring vehicles 125 may also comprise the V2X notification with sensor fusion system 200. In such embodiments, V2X communication subsystem 220 may receive the V2X notification from an impaired neighboring vehicle 125, roadside unit 115, and/or radio tower 110. V2X communication subsystem 220, signal processing subsystem 205 and/or impairment determination subsystem 215 may analyze the V2X notification associated with the impaired neighboring vehicle 125 to determine the nature of the impairment of the impaired neighboring vehicle 125 and extract any requests for action from the V2X notification. Based on the request for action (e.g., allow to pass, slow down, speed up, allow to merge, grant access to the right lane, grant access to the breakdown lane, grant additional space, and the like) the V2X notification with sensor fusion system 200 may provide the information to the driver via the communication interface 225.

In some embodiments, the impaired vehicle 120 and/or one or more neighboring vehicles 125 may be autonomous vehicles. In such embodiments, the V2X notification with sensor fusion system 200 may communicate with self-driving components of the impaired vehicle to perform requested actions (e.g., slow down, speed up, allow to pass, and so forth) and/or perform actions appropriate for impairments of the impaired vehicle 120 including, merging into the right lanes to access the breakdown lane, for example.

Figure 3:
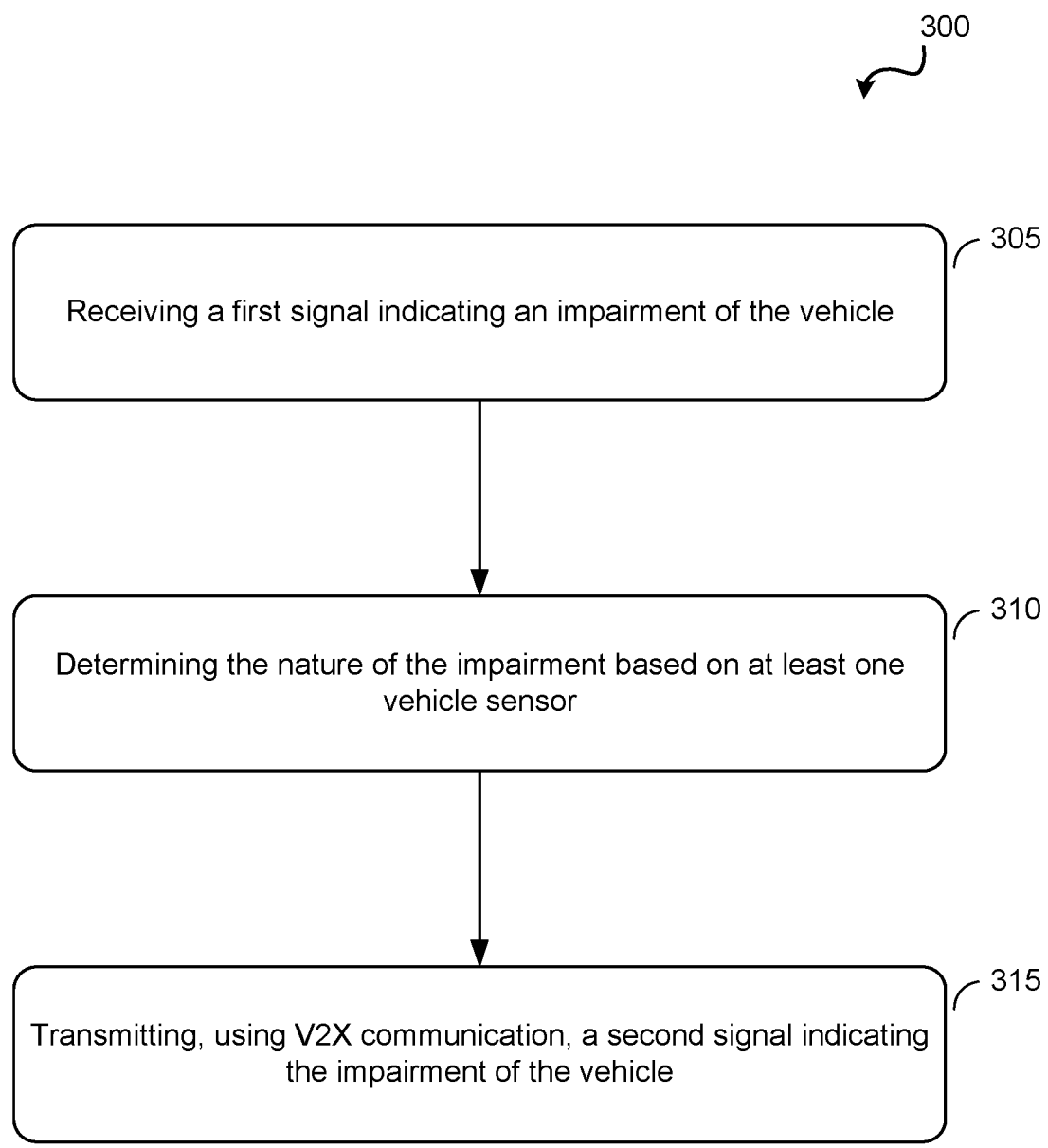
FIG. 3 illustrates a flow diagram of a method for V2X communication with sensor fusion, according to an embodiment.

FIG. 3 illustrates a method 300 for implementing emergency V2X notification with sensor fusion according to an embodiment. It can be noted that, as with figures appended hereto, FIG. 3 is provided as a non-limiting example. Other embodiments may vary, depending on desired functionality. For example, the functional blocks illustrated in method 300 may be combined, separated, or rearranged to accommodate different embodiments. The method 300 may be performed by, for example, impaired vehicle 120 or more specifically by V2X notification with sensor fusion system 200 as described with respect to FIG. 2. The method may be implemented as instructions stored in memory and executed by a processor. For example, instructions may be stored in memory 460 and executed by processing unit(s) 410 as described with respect to FIG. 4. Means for performing the functionality of method 300 may include hardware and/or software means of a moveable device, such as the UE 400 of FIG. 4 or the computer system 500 of FIG. 5.

The functionality at block 305 comprises receiving a first signal indicating an impairment of the vehicle. The first signal may be, for example, an indication from a sensor (e.g., sensor 230). The sensor may indicate a driver impairment (e.g., driver fatigue, driver health issue, driver substance use impairment, or the like), an occupant impairment (e.g., a passenger health issue, a passenger behavior issue, and the like), a vehicle malfunction (e.g., low tire pressure, engine overheating, transmission failure, brake failure, low oil pressure, low windshield washer fluid, or the like), an occupant distress signal (e.g., hazard light activation, verbal request for help, or the like), or any other distress signal. The signal may be received by, for example, signal processing subsystem 205. Means for performing the functionality at block 305 may include, for example, signal processing subsystem 205, V2X notification with sensor fusion system 200 and/or other hardware and/or software components of the impaired vehicle 120 or UE 400 and described herein.

The functionality at block 310 comprises determining the nature of the impairment based on at least one vehicle sensor. For example, sensor polling subsystem 210 may poll the impaired vehicle sensors to identify a status of each sensor including biometric sensors or other sensors that indicate a status of the occupants of the vehicle, vehicle malfunction sensors that indicate a status of the vehicle components, external force sensors that indicate whether the impaired vehicle is or has been subject to external forces (e.g., collision, high cross winds, and so forth). The initial signal may be from a sensor 230 that may indicate the nature of the impairment. Means for performing the functionality at block 310 may include, for example, impairment determination subsystem 215, sensor polling subsystem 210, V2X notification with sensor fusion system 200 and/or other hardware and/or software components of the impaired vehicle 120 or UE 400 and described herein.

The functionality at block 315 comprises transmitting, using V2X communication, a second signal indicating the nature of the impairment of the vehicle. For example, V2X communication subsystem 220 may generate a V2X notification that indicates the nature of the impairment, any actions taken by the impaired vehicle, any requested action by neighboring vehicles, and/or the like. The V2X notification may be transmitted to neighboring vehicles, roadside units, radio towers (e.g., base stations), and/or the like. The V2X notification may be transmitted as a unicast message, a multicast message, a broadcast message, and/or any other suitable message type. Means for performing the functionality at block 315 may include, for example, V2X communication subsystem 220, Wireless communication antenna(s) 235, V2X notification with sensor fusion system 200 and/or other hardware and/or software components of the impaired vehicle 120 or UE 400 and described herein.

In some embodiments, additional functionality may include engaging in V2X inter-vehicle negotiation and or receiving instructions from a roadside unit and/or radio tower. For example, based on the requested actions, neighboring vehicles may send and receive additional V2X messages to negotiate which vehicles will move in which way to accommodate the requested action. For example, to allow the impaired vehicle access to the right lane, perhaps multiple neighboring vehicles may have to slow down, some may have to speed up, and so forth. The actions for each vehicle may be negotiated to arrive at the result of allowing the impaired vehicle to the right lane. In some embodiments, an infrastructure entity such as a roadside unit or a radio tower (e.g., base station) may use the overall knowledge of the location of the impaired vehicle and neighboring vehicles in addition to each of their speed and other information to provide instructions to each vehicle to allow the impaired vehicle to, for example, gain access to the right lane as requested. Means for performing this functionality may include, for example, V2X communication subsystem 220, Wireless communication antenna(s) 235, V2X notification with sensor fusion system 200 and/or other hardware and/or software components of the impaired vehicle 120 or UE 400, base station 600, roadside unit 115, radio tower 110, and/or other hardware and/or software components of systems including computer system 500 and described herein.

Figure 4:
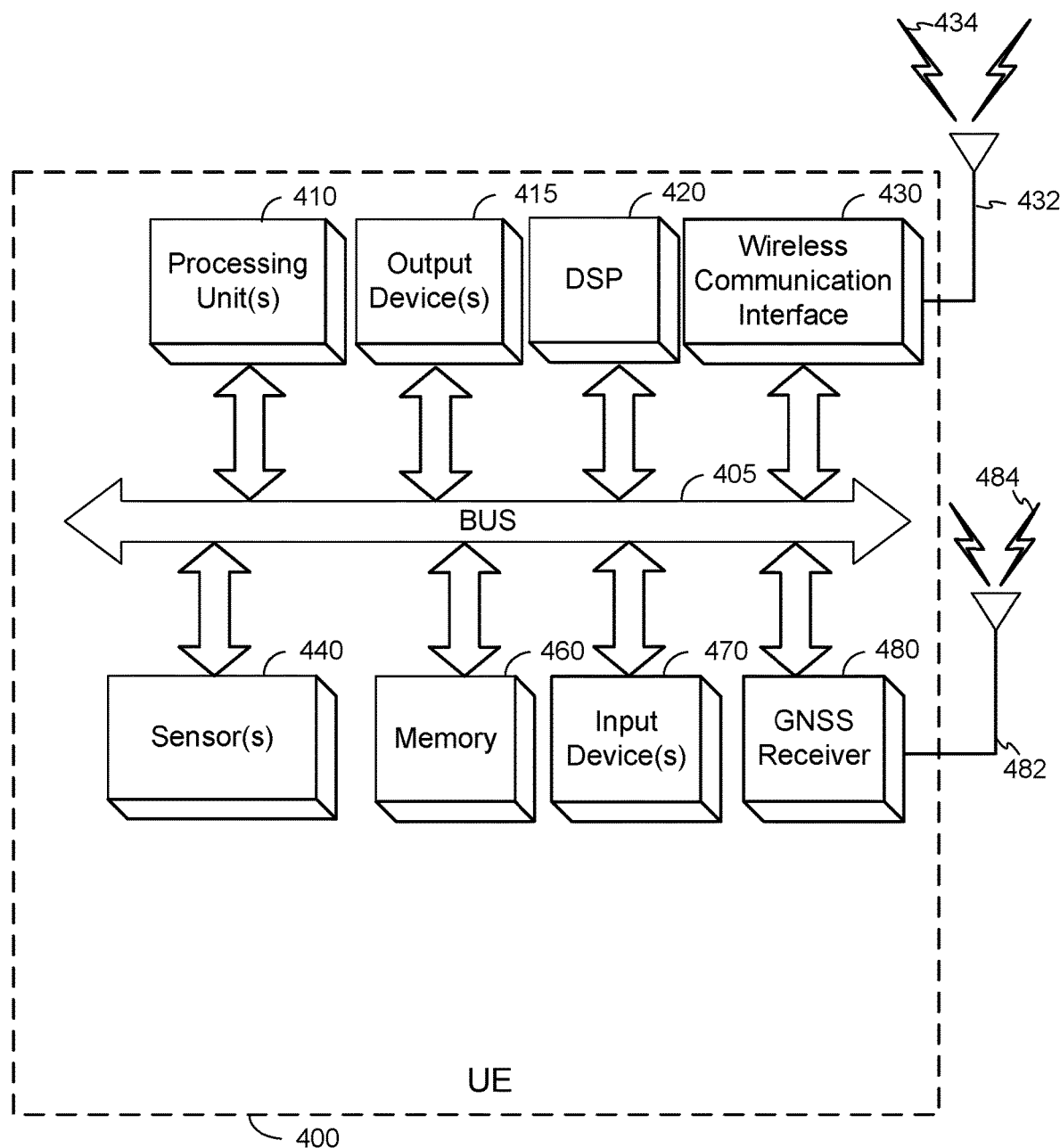
FIG. 4 illustrates an embodiment of a user equipment (UE).

FIG. 4 illustrates an embodiment of a UE 400, which can be utilized as described in the embodiments described herein and in association with FIGS. 1-3. For example, UE 400 may be a vehicle equipped to communicate using V2X communication. It should be noted that FIG. 4 is meant only to provide a generalized illustration of various components of UE 400, any or all of which may be utilized as appropriate. In other words, because UEs can vary widely in functionality, they may include only a portion of the components shown in FIG. 4. It can be noted that, in some instances, components illustrated by FIG. 4 can be localized to a single physical device and/or distributed among various networked devices, which may be disposed at different physical locations.

The UE 400 is shown comprising hardware elements that can be electrically coupled via a bus 405 (or may otherwise be in communication, as appropriate). The hardware elements may include a processing unit(s) 410 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 4, some embodiments may have a separate DSP 420, depending on desired functionality. The UE 400 also may comprise one or more input devices 470, which may comprise without limitation one or more touch screens, touch pads, microphones, buttons, dials, switches, and/or the like; and one or more output devices 415, which may comprise without limitation, one or more displays, light emitting diodes (LEDs), speakers, and/or the like.

The UE 400 might also include a wireless communication interface 430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the UE 400 to communicate via the networks described herein with regard to FIGS. 1-3. The wireless communication interface 430 may permit data to be communicated with a network, eNBs, ng-eNBs, gNBs, and/or other network components, computer systems, and/or any other electronic devices described herein. The communication can be carried out via one or more wireless communication antenna(s) 432 that send and/or receive wireless signals 434.

Depending on desired functionality, the wireless communication interface 430 may comprise separate transceivers to communicate with base stations (e.g., eNBs, ng-eNBs and/or gNBs) and other terrestrial transceivers, such as wireless devices and access points. The UE 400 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 400 can further include sensor(s) 440. Such sensors may comprise, without limitation, one or more inertial sensors (e.g., accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the functionality described herein.

Embodiments of the UE 400 may also include a GNSS receiver 480 capable of receiving signals 484 from one or more GNSS satellites (e.g., SVs 190) using an GNSS antenna 482 (which may be combined in some implementations with wireless communication antenna(s) 432). Such positioning can be utilized to complement and/or incorporate the techniques described herein. The GNSS receiver 480 can extract a position of the UE 400, using conventional techniques, from GNSS SVs (e.g. SVs 190) of an GNSS system, such as Global Positioning System (GPS), Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 480 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 400 may further include and/or be in communication with a memory 460. The memory 460 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 460 of the UE 400 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 400 (e.g., using processing unit(s) 410). In an aspect, then, such code and/or instructions can be used to configure and/or adapt a general purpose computer (or other device) to perform one or more operations in accordance with the described methods.

Figure 5:
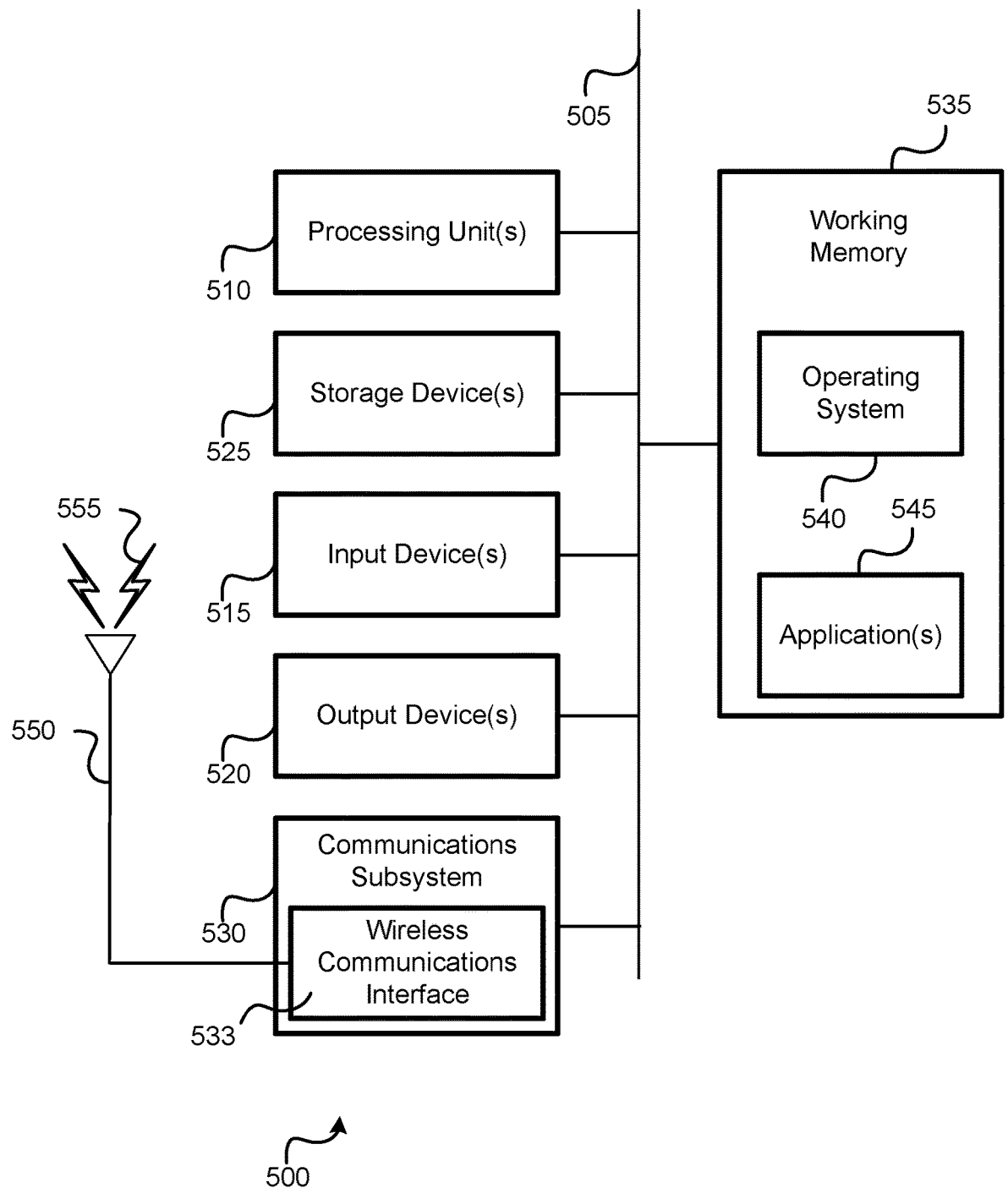
FIG. 5 illustrates an embodiment of a computer system.

FIG. 5 is a block diagram of an embodiment of a computer system 500, which may be used, in whole or in part, to provide the functions of one or more network components as described in the embodiments herein (e.g., impaired vehicle 120). It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. In addition, it can be noted that components illustrated by FIG. 5 can be localized to a single device and/or distributed among various networked devices, which may be disposed at different geographical locations.

The computer system 500 is shown comprising hardware elements that can be electrically coupled via a bus 505 (or may otherwise be in communication, as appropriate). The hardware elements may include processing unit(s) 510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 500 also may comprise one or more input devices 515, which may comprise without limitation a mouse, a keyboard, a camera, a microphone, and/or the like; and one or more output devices 520, which may comprise without limitation a display device, a printer, and/or the like.

The computer system 500 may further include (and/or be in communication with) one or more non-transitory storage devices 525, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 500 may also include a communications subsystem 530, which may comprise wireless communication technologies managed and controlled by a wireless communication interface 533, as well as wired technologies (such as Ethernet, coaxial communications, universal serial bus (USB), and the like). The wireless communication interface 533 may send and receive wireless signals 555 (e.g. signals according to 5th Generation New Radio (5G NR) or LTE) via wireless antenna(s) 550. Thus the communications subsystem 530 may comprise a modem, a network card (wireless or wired), an infrared communication device, a wireless communication device, and/or a chipset, and/or the like, which may enable the computer system 500 to communicate on any or all of the communication networks described herein to any device on the respective network, including a User Equipment (UE), other computer systems (e.g., impaired vehicle 120), and/or any other electronic devices described herein. Hence, the communications subsystem 530 may be used to receive and send data as described in the embodiments herein.

In many embodiments, the computer system 500 will further comprise a working memory 535, which may comprise a RAM or ROM device, as described above. Software elements, shown as being located within the working memory 535, may comprise an operating system 540, device drivers, executable libraries, and/or other code, such as one or more applications 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

Figure 6:
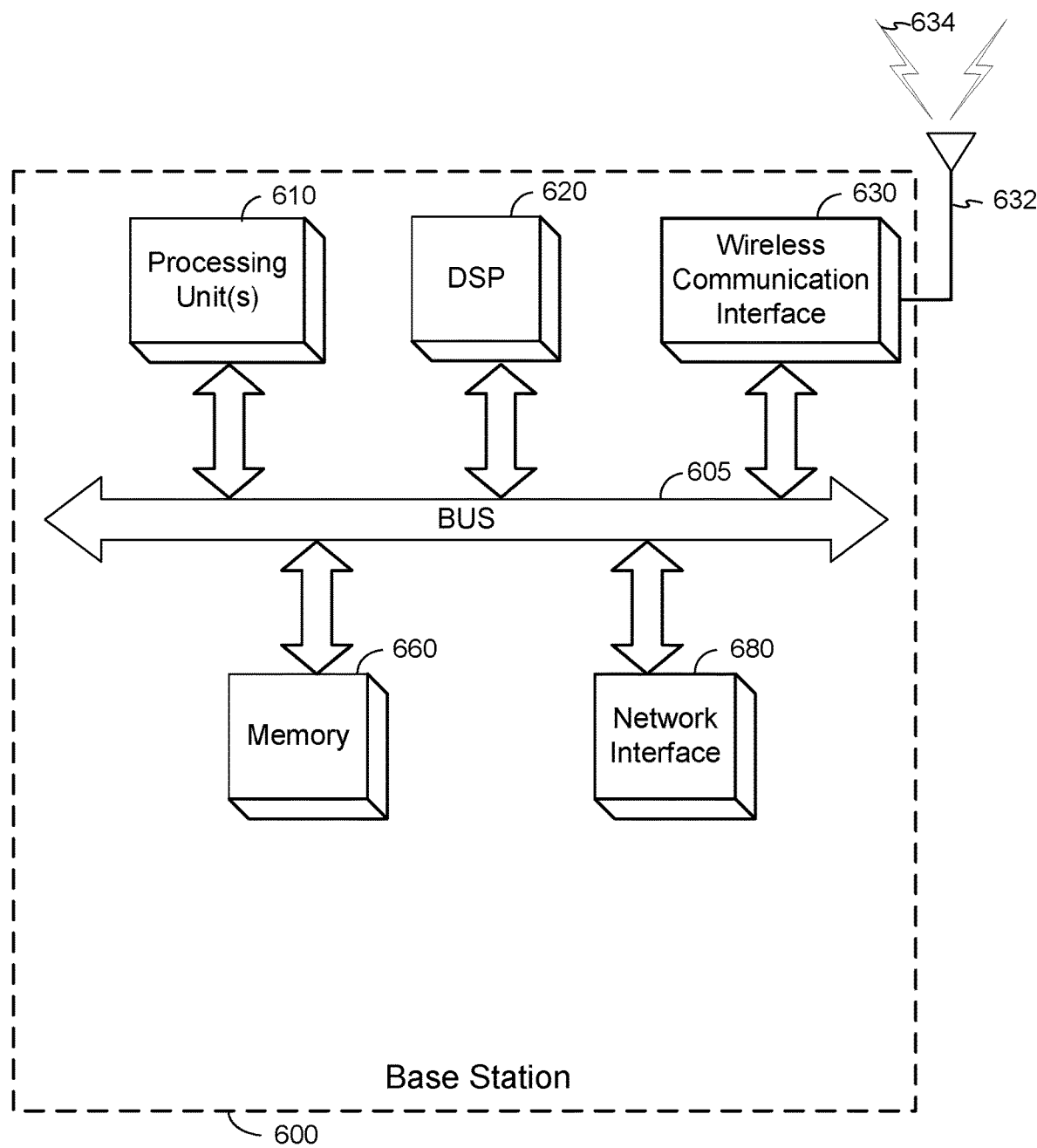
FIG. 6 illustrates an embodiment of a base station.

FIG. 6 illustrates an embodiment of a base station 600, which can be utilized as described herein (e.g., in association with FIGS. 1-3). It should be noted that FIG. 6 is meant only to provide a generalized illustration of various components, any or all of which may be utilized as appropriate. In some embodiments, the base station 600 may correspond to a gNB, an ng-eNB, and/or an eNB as described herein above.

The base station 600 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as DSP chips, graphics acceleration processors, ASICs, and/or the like), and/or other processing structure or means. As shown in FIG. 6, some embodiments may have a separate DSP 620, depending on desired functionality. Location determination and/or other determinations based on wireless communication may be provided in the processing unit(s) 610 and/or wireless communication interface 630 (discussed below), according to some embodiments. The base station 600 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 600 might also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX device, cellular communication facilities, etc.), and/or the like, which may enable the base station 600 to communicate as described herein. The wireless communication interface 630 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 632 that send and/or receive wireless signals 634.

The base station 600 may also include a network interface 680, which can include support of wireline communication technologies. The network interface 680 may include a modem, network card, chipset, and/or the like. The network interface 680 may include one or more input and/or output communication interfaces to permit data to be exchanged with a network, communication network servers, computer systems, and/or any other electronic devices described herein.

In many embodiments, the base station 600 will further comprise a memory 660. The memory 660 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 660 of the base station 600 also can comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the base station 600 (and/or processing unit(s) 610 or DSP 620 within base station 600). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets or the like), or both. Further, connection to other computing devices, such as network input/output devices, may be employed.

With reference to the appended figures, components that can include memory can include non-transitory machine-readable media. The terms "machine-readable medium," "computer-readable medium," "computer-readable memory device," and "machine readable media" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, RAM, PROM, EPROM, EEPROM, FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples. For example, future networks beyond fifth generation (5G) networks may implement embodiments herein.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that, throughout this Specification, discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device. It is understood that a general purpose computer can become a special purpose computer by virtue of installation and execution of software/code/executable instructions that perform such above described actions or processes, such as, for example, the method described in FIG. 3.

The terms "and" and "or" as used herein may include a variety of meanings that may depend, at least in part, upon the context in which such terms are used. Typically, the term "or," if used to associate a list (e.g., A, B, or C), is intended to (and may) mean A, B, and C, here used in the inclusive sense, as well as A, B, or C, here used in the exclusive sense. Similarly, the term "and," if used to associate a list (e.g., A, B, and C), is intended to (and may) mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, and so forth.

Having described several embodiments, it is understood that various modifications, alternative constructions, and equivalents may be used without departing from the spirit of this disclosure. For example, the above elements may merely be a component of a larger system, wherein, for example, other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method, comprising:
   receiving, by a processor of a first vehicle, a first signal indicating an impairment of the first vehicle;
   in response to receiving the first signal, determining, by the processor of the first vehicle, a nature of the impairment based on information from at least one vehicle sensor of a plurality of vehicle sensors;
   transmitting a first vehicle-to-anything (V2X) message indicating the nature of the impairment, wherein the first V2X message is an initial message in a plurality of V2X messages communicated among the first vehicle and at least one V2X capable entity, wherein the at least one V2X capable entity includes a second vehicle, and wherein the plurality of V2X messages includes a V2X message indicating a maneuver that the first vehicle will perform in response to the impairment together with a request for a neighboring vehicle to make room for the maneuver that the first vehicle will perform, and a second V2X message sent in response to the request, the second V2X message indicating an action that the second vehicle will perform in order to make room for the maneuver that the first vehicle will perform;
   wherein the first V2X message additionally indicates that the first vehicle has contacted emergency services;
   wherein the maneuver is for the first vehicle to enter a breakdown lane; and
   performing, by the first vehicle, the maneuver after the second vehicle has performed the action.

2. The method of claim 1, wherein the first signal is received due to the at least one vehicle sensor detecting the impairment.

3. The method of claim 2, further comprising:
   automatically activating, by the processor of the first vehicle, a hazard indicator in response to determining the impairment.

4. The method of claim 1, wherein the first signal is received due to an occupant of the first vehicle activating a hazard indicator.

5. The method of claim 4, wherein determining the nature of the impairment comprises:
   polling, by the processor, the plurality of vehicle sensors to obtain a vehicle status from each of the plurality of vehicle sensors.

6. The method of claim 1, wherein the first V2X message indicating the nature of the impairment is the same message as the V2X message indicating the maneuver that the first vehicle will perform in response to the impairment.

7. The method of claim 1, wherein the first V2X message comprises an indication of an action taken by the first vehicle.

8. The method of claim 1, wherein the plurality of vehicle sensors comprises at least one of a biometric sensor for sensing a vehicle occupant status, a visual sensor for sensing a driver status, a voice sensor for sensing verbal indication of the impairment, a wearable sensor paired to the first vehicle for sensing the vehicle occupant status, or a vehicle malfunction sensor for sensing a malfunction of the first vehicle.

9. The method of claim 1, wherein the first V2X message is transmitted by at least one of unicast, multicast, or broadcast.

10. The method of claim 6, wherein the first V2X message is transmitted to at least two neighboring vehicles including the second vehicle and a third vehicle, and wherein the second V2X message is sent after additional V2X messages between the second vehicle and the third vehicle, the additional V2X messages coordinating actions to be taken by the second vehicle and the third vehicle, including the action indicated in the second V2X message, to make room for the maneuver that the first vehicle will perform.

11. The method of claim 1, wherein the first V2X message is transmitted to an infrastructure entity.

12. The method of claim 11, further comprising:
receiving, from the infrastructure entity, a third V2X message indicating a course of action for the first vehicle to take, wherein the course of action includes the maneuver that the first vehicle will perform.

13. The method of claim 1, further comprising:
engaging, by the processor of the vehicle, in V2X inter-vehicle negotiation with one or more neighboring vehicles over the plurality of V2X messages, wherein the V2X inter-vehicle negotiation involves coordination between the first vehicle and the second vehicle of the maneuver that the first vehicle will perform or the action that the second vehicle will perform.

14. A vehicle comprising:
one or more processors; and
a memory having stored thereon instructions that, when executed by the one or more processors, cause the one or more processors to:
receive a first signal indicating an impairment of the vehicle;
in response to receiving the first signal, determine a nature of the impairment based on information from at least one vehicle sensor of a plurality of vehicle sensors;
transmit a first vehicle-to-anything (V2X) message indicating the nature of the impairment, wherein the first V2X message is an initial message in a plurality of V2X messages communicated among the vehicle and at least one V2X capable entity, wherein the at least one V2X capable entity includes a second vehicle, and wherein the plurality of V2X messages includes a V2X message indicating a maneuver that the vehicle will perform in response to the impairment together with a request for a neighboring vehicle to make room for the maneuver that the first vehicle will perform, and a second V2X message sent in response to the request, the second V2X message indicating an action that the second vehicle will perform in order to make room for the maneuver that the vehicle will perform;
wherein the first V2X message additionally indicates that the first vehicle has contacted emergency services;
wherein the maneuver is for the first vehicle to enter a breakdown lane; and
perform the maneuver after the second vehicle has performed the action.

15. The vehicle of claim 14 wherein the first signal is received due to the at least one vehicle sensor detecting the impairment.

16. The vehicle of claim 14, wherein the first V2X message indicating the nature of the impairment is the same message as the V2X message indicating the maneuver that the first vehicle will perform in response to the impairment.

17. The vehicle of claim 14, wherein the instructions comprise further instructions that, when executed by the one or more processors, cause the one or more processors to:
receive, from an infrastructure entity, a third V2X message indicating a course of action for the vehicle to take, wherein the course of action includes the maneuver that the vehicle will perform.

18. A system, comprising:
means for receiving a first signal indicating an impairment of a first vehicle;
means for, in response to receiving the first signal, determining the nature of the impairment based on information from at least one vehicle sensor of a plurality of vehicle sensors;
means for transmitting a first vehicle-to-anything (V2X) message indicating the nature of the impairment, wherein the first V2X message is an initial message in a plurality of V2X messages communicated among the first vehicle and at least one V2X capable entity, wherein the at least one V2X capable entity includes a second vehicle, and wherein the plurality of V2X messages includes a V2X message indicating a maneuver that the first vehicle will perform in response to the impairment together with a request for a neighboring vehicle to make room for the maneuver that the first vehicle will perform, and a second V2X message sent in response to the request, the second V2X message indicating an action that the second vehicle will perform in order to make room for the maneuver that the first vehicle will perform;
wherein the first V2X message additionally indicates that the first vehicle has contacted emergency services;
wherein the maneuver is for the first vehicle to enter a breakdown lane; and
means for performing the maneuver after the second vehicle has performed the action.

19. The system of claim 18, wherein the first signal is received due to the at least one vehicle sensor detecting the impairment.

* * * * *